United States Patent
Xu et al.

(10) Patent No.: US 12,217,450 B2
(45) Date of Patent: Feb. 4, 2025

(54) VEHICLE LOCALIZATION

(71) Applicant: Ford Global Technologies, LLC, Dearborn, MI (US)

(72) Inventors: Ming Xu, West End (AU); Sourav Garg, Kelvin Grove/Brisbane (AU); Michael Milford, Gaythorne (AU); Punarjay Chakravarty, Campbell, CA (US); Shubham Shrivastava, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 17/666,609

(22) Filed: Feb. 8, 2022

(65) Prior Publication Data
US 2023/0252667 A1    Aug. 10, 2023

(51) Int. Cl.
*G06T 7/70* (2017.01)
*G06V 10/46* (2022.01)

(52) U.S. Cl.
CPC .............. *G06T 7/70* (2017.01); *G06V 10/46* (2022.01); *G06T 2207/20084* (2013.01); *G06T 2207/30244* (2013.01); *G06T 2207/30252* (2013.01)

(58) Field of Classification Search
CPC ............ G06T 7/70; G06T 2207/20084; G06T 2207/30244; G06T 2207/30252; G06V 10/46; G06V 10/82
See application file for complete search history.

(56) References Cited

U.S. PATENT DOCUMENTS

| | | | |
|---|---|---|---|
| 10,269,147 B2* | 4/2019 | Jones | G06T 7/579 |
| 2019/0033867 A1* | 1/2019 | Sharma | G06T 7/73 |
| 2019/0080467 A1* | 3/2019 | Hirzer | G06T 7/73 |
| 2020/0334857 A1 | 10/2020 | Garud et al. | |
| 2021/0279909 A1 | 9/2021 | Zhou et al. | |
| 2021/0319584 A1* | 10/2021 | Qian | G06V 20/588 |

FOREIGN PATENT DOCUMENTS

CN    112216142 A    1/2021

OTHER PUBLICATIONS

Praveen, et al. (Computer English Translation of Chinese Patent No. CN 111907527 a), pp. 1-19 (Year: 2020).*
Pion et al., "Benchmarking Image Retrieval for Visual Localization", arXiv:2011.11946v2 [cs.CV] Dec. 1, 2020.
Revaud et al., "Learning with Average Precision: Training Image Retrieval with a Listwise Loss", arXiv:1906.07589v1 [cs.CV] Jun. 18, 2019.

* cited by examiner

*Primary Examiner* — Daniel G Mariam
(74) *Attorney, Agent, or Firm* — Frank A. MacKenzie; Brooks Kushman P.C.

(57) ABSTRACT

An approximate camera location on a route can be determined by inputting a first image acquired by a vehicle camera to a first convolutional neural network. First image feature points can be extracted from the first image using a feature extraction algorithm. Pose estimation parameters for a pose estimation algorithm can be selected based on the approximate camera location. A six degree-of-freedom (DoF) camera pose can be determined by inputting the first image feature points and second feature points included in a structure-from-motion (SfM) map based on the route to the pose estimation algorithm which is controlled by the pose estimation parameters. A six DoF vehicle pose can be determined based on the six DoF camera pose.

20 Claims, 7 Drawing Sheets

VEHICLE LOCALIZATION

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

Figure 1:
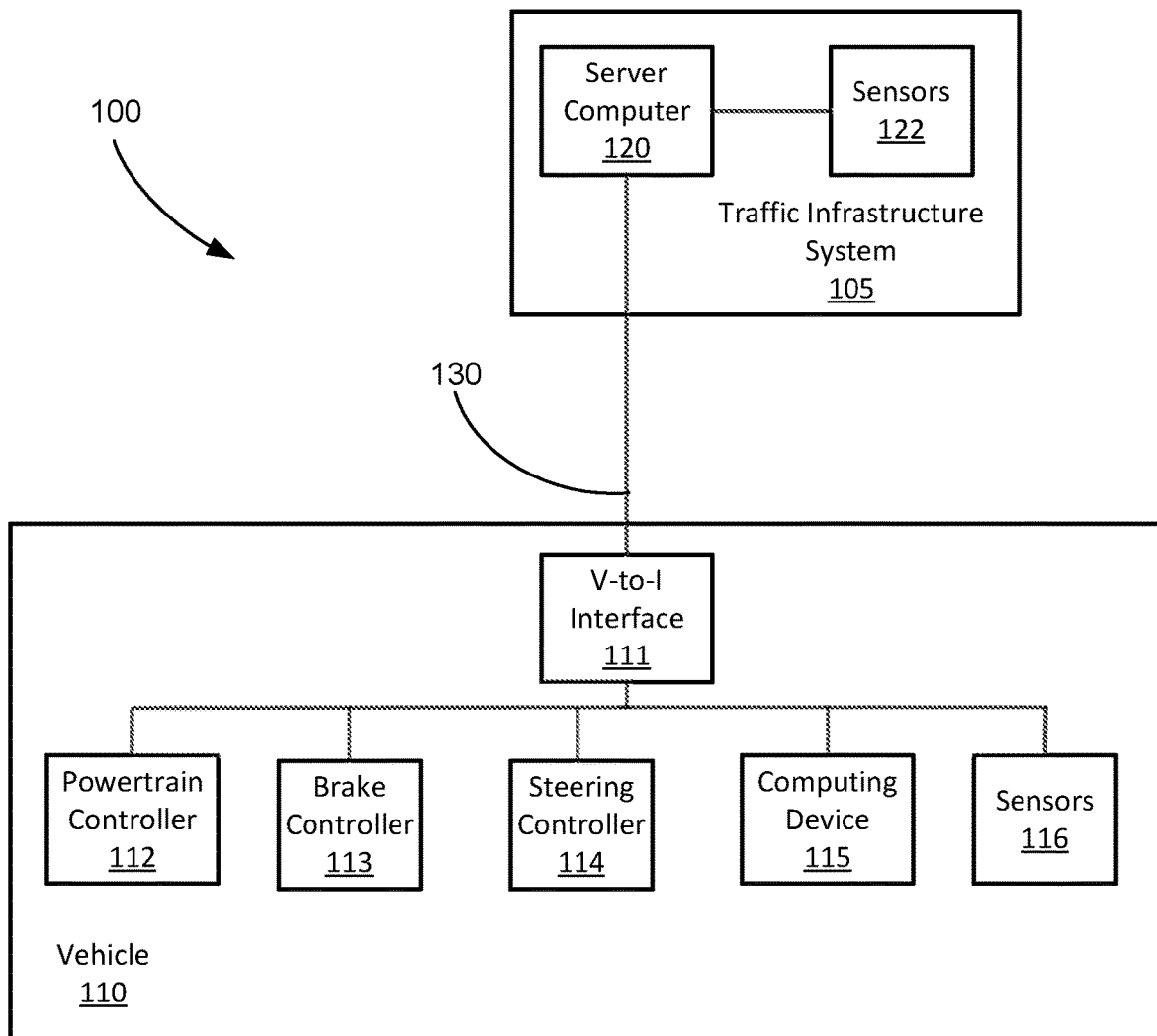
FIG. 1 is a block diagram of an example traffic infrastructure system.

A sensing system can acquire data, for example image data, regarding an environment around the system and process the data to determine locations of objects. For example, computers can be programmed to determine locations of objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to determine the location of an object, for example a vehicle, in a traffic scene and determine a vehicle path for operating a vehicle based on the determined location. A traffic scene is an environment around a traffic infrastructure system or a vehicle that can include a portion of a roadway and objects including buildings, bridges, vehicles and pedestrians, etc. For example, a computing device in a vehicle can be programmed to acquire one or more images from one or more sensors included in the vehicle, determine locations of objects in the images and determine the location of the vehicle with respect to the determined locations of the objects. Determining the location of a vehicle based on processing images of an environment around the vehicle can be referred to as vehicle localization or six degree of freedom (DoF) camera pose estimation.

Operating a vehicle based on vehicle localization can include determining a six degree-of-freedom (DoF) pose for the vehicle. A six DoF pose includes three position measurements with respect to x, y, and z orthogonal axes and three rotational measurements (roll, pitch, and yaw) about the three orthogonal axes, respectively. Six DoF pose is typically measured with respect to a global coordinate system, for example latitude, longitude, and altitude. Operating a vehicle based on vehicle localization can include determining a six DoF pose of the vehicle to within +/−10 centimeters (cm) in x, y, and z coordinates and +/−one degree in each of the three rotations. Determining vehicle six DoF pose within +/−10 cm in positions and +/−one degree in rotations can permit operation of a vehicle moving at legal speed limits on a roadway in traffic, for example.

Techniques for vehicle localization include a global positioning system (GPS) receiver that determines vehicle location using satellite signals. GPS location data can be improved to approach 10 cm (centimeters) in precision using real time kinematics (RTK) signals which augment satellite data with terrestrial signals. GPS-RTK suffers from problems due to blockages and multiple signal reflections caused by structures such as tunnels, bridges, and tall buildings. An inertial measurement unit (IMU) employs accelerometers to determine relative motion. IMUs require additional hardware and software for initialization and calibration to determine locations with regard to global coordinates and IMUs with accuracy and reliability required to provide vehicle localization are too prohibitively expensive to include in vehicles. Vehicle localization based on image data as described herein can provide six DoF vehicle pose data within +/−10 cm in positions and +/−in rotations without requiring additional sensor and computing resources beyond typical sensors and computing resources already included in autonomous vehicles without problems caused by signal blockage or multiple signal reflections.

Advantageously, vehicle localization by six DoF camera pose estimation as described herein can improve the ability of a computing device in a vehicle to determine six DoF vehicle poses in an environment around the vehicle using a monocular RGB camera. A monocular camera includes a single lens assembly having a single optical axis that forms images on a single sensor or sensor assembly. An RGB camera is a camera that acquires color image data that includes separate red, green and blue pixels. Six DoF camera pose estimation as discussed herein uses images acquired by a monocular RGB camera and a computing device included in a vehicle to determine a six DoF vehicle pose based on a previously acquired structure from motion (SM) map. An SfM map includes three-dimensional (3D) data regarding an environment around a vehicle route, where a route is a connected series of locations including a starting point and an end point determined in global coordinates with respect to a map that can be traveled along by a vehicle. Six DoF camera pose estimation as described herein can be used for vehicle localization on a stand-alone basis or combined with GPS-RTK vehicle localization to improve reliability and accuracy of vehicle localization.

Six DoF camera pose estimation using a previously acquired SfM map can be referred to as a type of simultaneous localization and mapping (SLAM). SLAM can be described as determining or updating a map of an unknown environment while determining the location of an agent, such as a vehicle, within the map. Techniques discussed herein improve basic SLAM techniques by acquiring a map of a route by traversing the route and then adjusting parameters which control six DoF camera pose estimation based on image data acquired on subsequent traverses of the route. Parameters such as camera selection, image region selection, local feature matcher selection, a reprojection error selection, and RANSAC scoring function selection can be selected to improve six DoF camera pose estimation. These parameters will be discussed in relation to FIG. 6, below. Selecting parameters in this fashion can increase accuracy and reliability of six DoF camera pose estimation based on an SfM map and permits six DoF camera pose to be estimated over longer time periods without requiring updates to the SfM map, i.e., despite seasonal changes to the environment and changes to buildings and structures included in the SfM map.

A method is disclosed herein including determining an approximate camera location on a route by inputting a first image acquired by a camera to a convolutional neural network, extracting first image feature points from the first image, selecting pose estimation parameters for a pose estimation algorithm based on the approximate camera location, determining a six degree-of-freedom (DoF) camera pose by inputting the first image feature points and second feature points included in a structure-from-motion (SfM) map based on the route to the pose estimation algorithm which is controlled by the pose estimation parameters, and determining a six DoF vehicle pose based on the six DoF camera pose. A vehicle can be operated by determining a vehicle path based on the six DoF vehicle pose. A dataset of reference images can be acquired by a camera included in a vehicle as it travels the route. The convolutional neural network can be trained based on a generic dataset of reference images. The SfM map can include a collection of three-dimensional points visible from the route generated by determining three-dimensional locations of image feature points in global coordinates from the dataset of reference images and combining them using a 3D mapping software program.

The pose estimation algorithm can include a Perspective-n-Point (P-n-P) algorithm in a Random Sample Consensus (RANSAC) loop. The pose estimation parameters can include one or more of camera selection, image region selection, a feature matcher, a reprojection error, and a RANSAC scoring function. The pose estimation parameters can be selected based on the approximate camera location with respect to overlapping portions of the route having approximately equal length. Extracting the first image feature points from the first image can include using a feature extraction algorithm which includes one or more of Superpoint, Reliable and Repeatable Detector and Descriptor, and Scale Invariant Feature Transform. The six DoF vehicle pose can be determined based on the six DoF camera pose by determining a six DoF offset between the vehicle and the camera. The six DoF camera pose and the six DoF vehicle pose can be determined in global coordinates with respect to three orthogonal position axes and three rotations about the three orthogonal position axes, respectively. The 3D mapping software program can include one or more of COLMAP, AgiSoft Metashape, and VisualSFM. The pose estimation software can be run for n trials with different configuration parameters and different random seeds. A paired two sample t-test for statistical significance can be used to compare results from a trial with the baseline configuration.

Further disclosed is a computer readable medium, storing program instructions for executing some or all of the above method steps. Further disclosed is a computer programmed for executing some or all of the above method steps, including a computer apparatus, programmed to determine an approximate camera location on a route by inputting a first image acquired by a camera to a convolutional neural network, extract first image feature points from the first image, select pose estimation parameters for a pose estimation algorithm based on the approximate camera location, determine a six degree-of-freedom (DoF) camera pose by inputting the first image feature points and second feature points included in a structure-from-motion (SfM) map based on the route to the pose estimation algorithm which is controlled by the pose estimation parameters, and determine a six DoF vehicle pose based on the six DoF camera pose. A vehicle can be operated by determining a vehicle path based on the six DoF vehicle pose. A dataset of reference images can be acquired by a camera included in a vehicle as it travels the route. The convolutional neural network can be trained based on a generic dataset of reference images. The SfM map can include a collection of three-dimensional points visible from the route generated by determining three-dimensional locations of image feature points in global coordinates from the dataset of reference images and combining them using a 3D mapping software program.

The instructions can include further instructions wherein the pose estimation algorithm can include a Perspective-n-Point (P-n-P) algorithm in a Random Sample Consensus (RANSAC) loop. The pose estimation parameters can include one or more of camera selection, image region selection, a feature matcher, a reprojection error, and a RANSAC scoring function. The pose estimation parameters can be selected based on the approximate camera location with respect to overlapping portions of the route having approximately equal length. Extracting the first image feature points from the first image can include using a feature extraction algorithm which includes one or more of Superpoint, Reliable and Repeatable Detector and Descriptor, and Scale Invariant Feature Transform. The six DoF vehicle pose can be determined based on the six DoF camera pose by determining a six DoF offset between the vehicle and the camera. The six DoF camera pose and the six DoF vehicle pose can be determined in global coordinates with respect to three orthogonal position axes and three rotations about the three orthogonal position axes, respectively. The 3D mapping software program can include one or more of COLMAP, AgiSoft Metashape, and VisualSFM. The pose estimation software can be run for n trials with different configuration parameters and different random seeds. A paired two sample t-test for statistical significance can be used to compare results from a trial with the baseline configuration.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi-or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
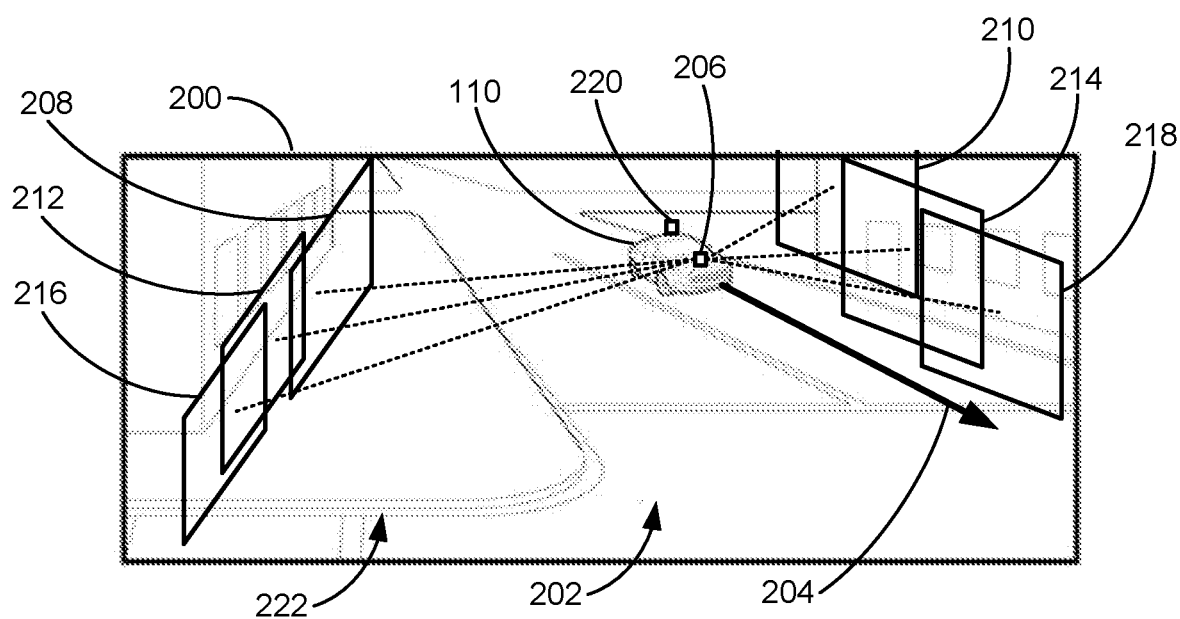
FIG. 2 is a diagram of an example traffic scene.

FIG. 2 is a diagram of a traffic scene 200. Traffic scene 200 includes a roadway 202 and a vehicle 110. Vehicle 110 travels on the roadway 202 along a route 204. A camera 206, which can be a monocular RGB camera, acquires (indicated by dotted lines) images 208, 210, 212, 214, 216, 218 (collectively images 222) as the vehicle 110 travels on roadway 202 along route 204. Images 222 can be stored in a computing device 115 included in vehicle 110 along with six DoF pose data regarding the location of vehicle 110 at the time each image 208, 210, 212, 214, 216, 218 is acquired. The six DoF pose data can be determined by one or more of GPS-RTK data, IMU data, and lidar sensor 220 data. The GPS-RTK data, the IMU data and the lidar sensor 220 data can be combined with high-resolution map data downloaded from a server computer 120, for example, to determine six DoF vehicle pose data in global coordinates.

The images 222 and six DoF vehicle pose data indicating the location of the vehicle at the time each image 208, 210, 212, 214, 216, 218 was acquired can be processed to determine an image database and SfM map for the route 204. The image database and SfM map can be stored in a memory included in a computing device 115 in vehicle 110 or transmitted to a server computer 120. At a later time, a vehicle traveling on route 204 can recall the image database and SfM map from computing device 115 memory or receive the image database and SfM map from a server computer 120 and use the image database and SfM map to determine a vehicle six DoF pose using six DoF camera pose estimation. Prior to being entered into an image database, the images 222 are processed by computing device 115 or server computer 120 to determine image feature points. An image feature point is a location in an image determined by image processing software that determines image locations based on arrangements of pixel values. For example, pixel values that form edges, corners, intersections of lines, etc. can be used to determine feature points.

Figure 3:
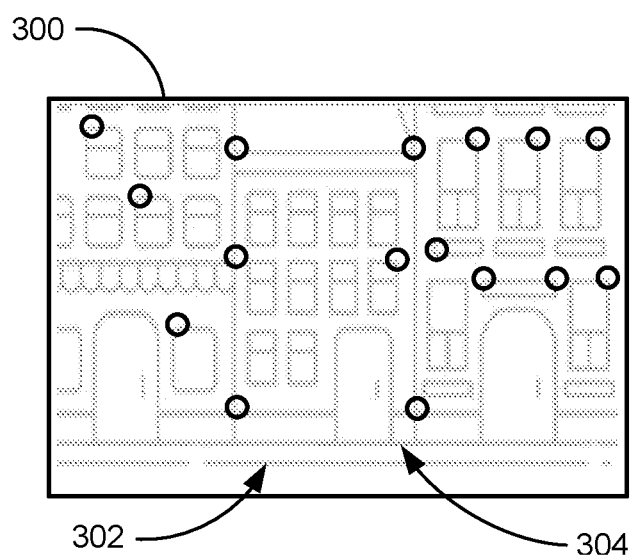
FIG. 3 is a diagram of an example image of a traffic scene including feature points.

FIG. 3 is a diagram of an image 300 of an environment around a vehicle 110 acquired while the vehicle 110 traveled on a route 204. The image 300 includes objects that occur in the environment around the vehicle, which can include foliage, or in this example, buildings 302. Image 300 can be processed using image processing software to determine feature points 304, indicated in image 300 as circles. Examples of image processing software that can determine feature points 304 in an image 300 include Superpoint, Reliable and Repeatable Detector and Descriptor (R2D2), and Scale Invariant Feature Transform (SIFT). Superpoint, R2D2, and SIFT are software programs that input image data and output feature points. Superpoint, R2D2, and SIFT all determine feature points by processing pixel neighborhoods to determine locations of arrangements of pixel values that can be reliably and repeatably determined in a plurality of images that include the same object despite differences in illumination, scale, and viewpoint. Superpoint, R2D2, and SIFT can determine feature points that are invariant with respect to differences in conditions under which images are acquired. For example, Superpoint, R2D2, and SIFT can determine the same feature points on similar objects despite being acquired at different times of day with different lighting conditions from different viewpoints.

Six degree of freedom camera pose estimation as described herein processes acquired images 222 with one or more of Superpoint, R2D2, and SIFT to determine feature points 304. The images 222, the feature points for each image 300 and the six DoF pose of the camera at the time the images 222 were acquired can be input to an image database for a route 204. The six DoF camera pose can be determined by adding a six DoF camera offset to a six DoF vehicle pose. A six DoF camera offset is the difference in location and orientation of a camera with respect to the location and orientation of the vehicle. Because the camera is in a fixed relationship with the vehicle, the six DoF camera offset can be measured at the time the camera is installed in the vehicle, typically at the time of manufacturing. The image database can be constructed by traveling the route 204 once and acquiring overlapping images 222 or the route 204 can be traveled a plurality of times and the images 222 from the plurality of traverses of the route 204 processed and input to the image database. The feature points 304 included in the image database are 2D feature points 304, meaning that the feature points are determined with respect to their x, y pixel location in a 2D image array. The image database can then be used to create an SfM map based on a route 204.

Figure 4:
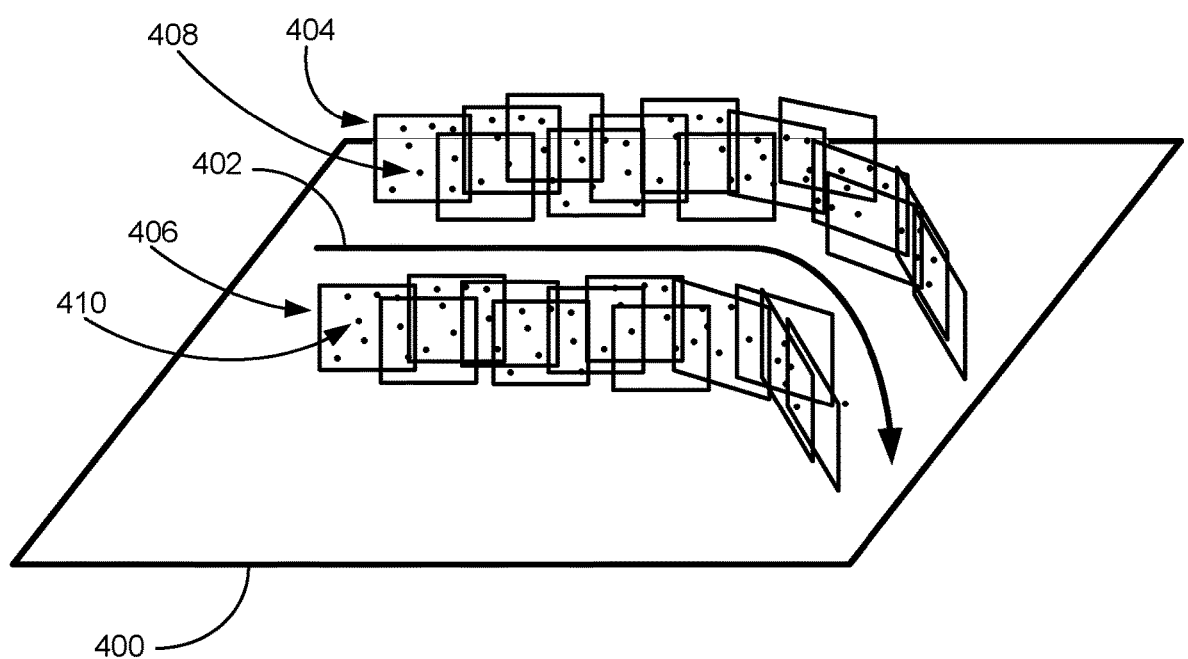
FIG. 4 is a diagram of an example structure from motion (SfM) map

FIG. 4 is a diagram of an SfM map 400. An SfM map includes a route 402 that has been traveled one or more times by a camera included in a vehicle 110 as it travels the route, acquiring images 404, 406 and building an image database that includes images 404, 406, six DoF camera poses for each image and feature points 408, 410 for each image. The images 404, 406 overlap meaning that various feature points 408, 410 can each occur in more than one image 404, 406. Because the images 404, 406 were acquired while the vehicle 110 was traveling along route 402, feature points 408, 410 are typically viewed in six degrees of freedom from more than one location. This permits the location of a single 2D feature point 408, 410 to be triangulated from two or more different points of view and a three-dimensional 3D location of the feature point 408, 410 determined with respect to the route 402. SfM map 400 illustrates a plurality of images 404, 406 combined in relation to a route 402 based on feature points 408, 410. Images 404, 406 can be combined into an SfM map 400 using mapping software that generates 3D point cloud maps such as an SfM map from image data.

An example of mapping software that generates a 3D point cloud map from image data is the COLMAP software program (https://colmap.github.io, available as of the filing date of this application). COLMAP is described in J. L. Schönberger and J. Frahm, "Structure-from-Motion Revisited," 2016 IEEE Conference on Computer Vision and Pattern Recognition (CVPR), 2016, pp. 4104-4113. Other 3D mapping software programs include AgiSoft Metashape, available as of the filing date of this application from https://www.agisoft.com/and VisualSFM, available from http://ccwu.me/vsfm/. AgiSoft Metashape is also referred to photogrammetry software, photogrammetry being a term that refers to determining measurements from photographs.

Figure 5:
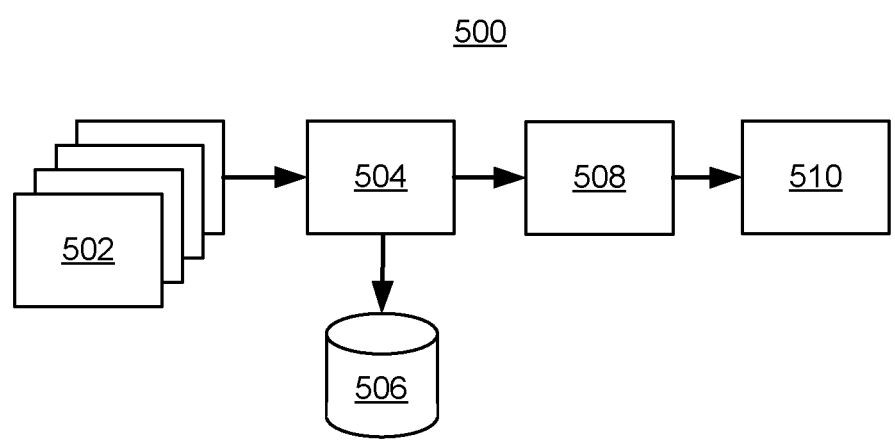
FIG. 5 is a diagram of an example route system.

FIG. 5 is a diagram of a route system 500 that can output an SfM map 510. Route system 500 can receive as input a plurality of images 502 including six DoF camera poses acquired as a vehicle traverses a route 204, 402. The images 502 including six DoF camera poses are input to a feature point extraction block 504 to determine 2D feature points included in the images 502. Feature point extraction can include one or more of Superpoint, R2D2, or SIFT. In an alternative implementation, a convolutional neural network can be trained based on a dataset of acquired reference images to extract 2D feature points from images 502 in the feature point extraction block 504. The images 502, six DoF camera poses and extracted 2D feature points can be output to image database 506 and passed to SfM construction block 508. The SfM map includes a collection of three-dimensional points that can be captured from the route with optical sensors and generated by determining three-dimensional locations of image feature points in global coordinates from the dataset of reference images and combining them using a COLMAP algorithm, for example. At SfM construction block 508, COLMAP software can construct a 3D SfM map from the images 502, six DoF poses, and 2D feature points as discussed above in relation to FIG. 4. A completed SfM map 510 can be output from SfM construction block 508.

Figure 6:
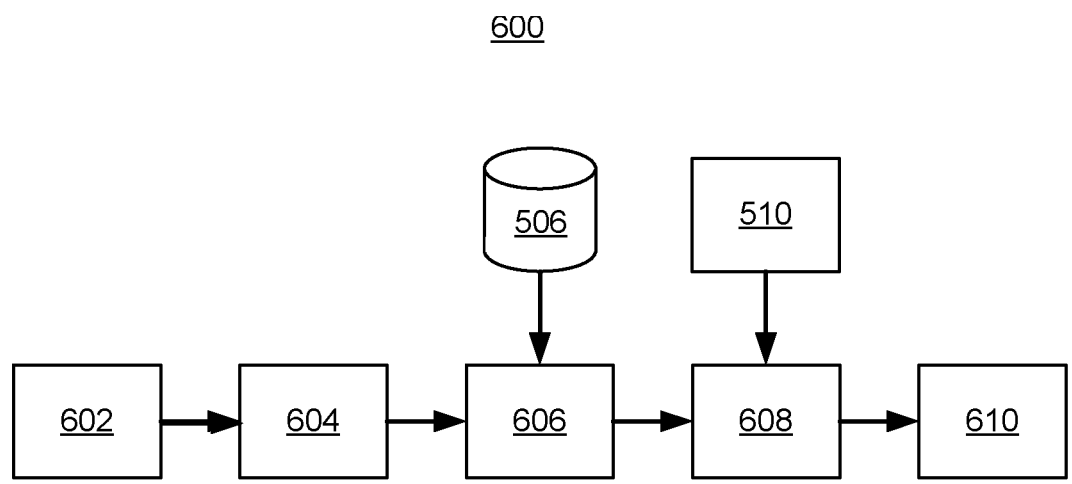
FIG. 6 is a diagram of an example six degree of freedom camera pose system.

FIG. 6 is a diagram of a six DoF camera pose system 600. Six DoF camera pose system 600 can receive as input an image 602 acquired by a vehicle camera 206 as the vehicle 110 travels on a route 204, 402, and outputs a six DoF vehicle pose. The six DoF vehicle pose is determined in global coordinates with respect to the three orthogonal x, y, z axes and the three rotations about the orthogonal position axes. The six DoF vehicle pose can be determined based on one or more six DoF camera poses and one or more of the six DoF offsets between the cameras and the vehicle. The six DoF camera poses can be determined based on acquired camera data combined into an SfM map. The route 204, 402 has been previously traveled one or more times by vehicle 110 or another vehicle equipped with sensors to acquire image data and six DoF camera pose data. An image database 506 and an SfM map 510 have been generated by a route system 500 and recalled from memory included in a computing device 115 included in vehicle 110 or downloaded from server computer 120. In addition to image database 506 and SfM map 510, six DoF camera pose system 600 has been used to process images from image database 506 to determine optimal image parameters for determining six DoF camera poses from SfM map 510.

As will be discussed further below, at six DoF camera pose determination block 608 a perspective-n-point (P-n-P) algorithm in a random sample consensus (RANSAC) loop determines a six DoF camera pose by comparing 2D feature points extracted from an image 602 to 3D points included in an SfM map 510. At the time the SfM map 510 is generated as discussed above in relation to FIG. 4, the route is divided into potentially overlapping segments, which can be approximately equal length and about 100 meters in length, for example. The segments can be determined to overlap from 0 to 75%, for example. The segments and overlaps can be determined by similarities in the contents of the images acquired along the segment. For example, a route segment can include images that include mainly foliage. Another segment can include images that include mainly buildings. Dividing the route into segments in this fashion can permit the P-n-P/RANSAC loop to be optimized for the contents of the image data being processed.

At the time the SfM map is determined, images from the image database can be input to the six DoF camera pose system 600 a plurality of times, each time varying the camera selection, image region selection and pose estimations parameters that control the P-n-P/RANSAC loop. Camera selection refers to selecting which of a possible plurality of cameras including in a vehicle 110 from which to acquire an image. Each camera included in a vehicle 110 can have a different field of view with respect to the environment around the vehicle 110 and as a result, images from different cameras can match images included in the image database differently. Images from the different cameras can be compared to images in the image database using a convolutional neural network to determine which image matches the image database most closely. A convolutional neural network that compares images can be trained on a generic dataset that includes random images acquired of environments around vehicles.

Once the camera image that most closely matches the image database is selected, a subset of feature points included in the SfM map included in the matching images from the image database are selected. During training, the output six DoF camera pose can be compared to the ground truth six DoF camera pose included in the image database to determine the accuracy of the output six DoF camera pose based on the selected image, the selected image region, i.e., subset of feature points from one or more reference images, and the selected pose estimation parameters. The image, image region and pose estimation parameters that determine the most accurate six DoF camera pose can be selected for the route segment that includes the six DoF camera pose.

A single configuration of image, image region and pose estimation parameters is given by a combination of values for these variables (e.g., MNN matcher, 5px reprojection error, 5000 RANSAC iterations, MAGSAC scoring. 10 retrieved reference images). Our method aims to select the best configuration from a set of N possible configurations (C1, . . . . CN) for each location in each segment of the route. One of these configurations, say C1, will be a baseline configuration. These can be default parameters within the software packages which implement PnP+RANSAC (e.g. OpenCV), or they can be the optimal set of parameters with respect to pose estimation performance for the entire route across all possible configurations. By default, for each location along the route, the baseline C1 can be selected. However, if any of the remaining configurations yields superior six DoF camera pose estimation performance based on comparing the x, y location of the vehicle 110 for the associated training images with ground truth, it will be preferable to use one of those configurations instead.

For each training image associated with a location for a given configuration Ci, we run n trials with a different random seed passed to PnP+RANSAC for each trial along with the given configuration parameters. This yields a set of values for translation error $t\_i$, is included in 1 . . . $t\_i.n$, where $t\_i$ is the translation error for configuration i trial j. Random seed values are identical for the same trial number between all configurations. This procedure is also performed for the baseline C1. For C2, . . . . CN, we use a paired two sample t-test for statistical significance for means to compare samples $t\_i.1$ . . . $t\_i.n$ to the baseline $t\_1.1$ . . . $t\_1.n$.

We want to test if for configuration Ci that the true mean translation error is lower than the baseline (in other words, that Ci is better than C1 accounting for the inherent randomness present in RANSAC).

We select a paired two-sample t-test compared to the standard two-sample t-test since samples between configurations for the same trial share the same random seed. The paired t-test will yield a p-value for configuration Ci, denoted p_i, and by comparing this p_i to a user-selected critical value (e.g., 0.05 or 0.1) we can determine if configuration Ci is superior to the baseline C1. For each configuration C2 . . . . CN we have a set of associated p-values p_1, . . . , p_N determined by performing the paired two-sample t-test. If none of these p-values is less than the critical value, none of the other configurations are better in a statistically significant sense compared to the baseline and we select C1 as the place configuration. Otherwise, we select the configuration with the lowest p-value, which is a proxy for determining the strongest configuration.

Continuing with FIG. 6, an image 602 acquired by a camera 206 in a vehicle 110 is input to 2D feature point extraction block 604 to extract 2D feature points as discussed above in relation to FIGS. 4 and 5. Image retrieval is performed first, using techniques such as APGeM, Dense VLAD, NetVLAD, etc. This step determines the set of images from the image database to perform 2D-2D matching between 2D feature points. APGeM is Average Precision Generalized Mean Pooling and is described in "Learning with Average Precision: Training Image Retrieval with a Listwise Loss" by Jerome Revaud, Jon A. Almazán, Rafael S. Rezende, Cesar De Souza, ICCV 2019. Dense VLAD is another technique for retrieving matching images from and image database and is described in "Large-scale Localization Datasets in Crowded Indoor Spaces" by Donghwan Lee, Soohyun Ryu, Suyong Yeon, Yonghan Lee, Deokhwa Kim, Cheolho Han, Yohann Cabon, Philippe Weinzaepfel, Nicolas Guérin, Gabriela Csurka, Martin Humenberger, CVPR 2021. NetVLAD is another technique for determining matching images from an image database and is described in "NetVLAD: CNN architecture for weakly supervised place recognition" by Relja Arandjelovic, Petr Gronat, Akihiko Torii, Tomas Pajdla, Josef Sivic, CVPR 2016. These techniques compare 2D feature points from the input image 602 to 2D feature points included in the image database 506 to determine a set of images from the image database that include one or more of the extracted 2D feature points.

The extracted 2D feature points are input to 2D-2D matching 606 where the extracted 2D-2D matching can be performed by iteratively matching the locations of the extracted 2D feature points to locations of feature points in the image database to minimize the summed Euclidian distance between the two sets. For example, matches can be determined using mutual nearest neighbors. For an image pair, two features are considered to satisfy mutual nearest neighbors if the minimum Euclidean feature distance point matched in the second image by the first feature has the first feature as it's corresponding minimum distance point. Geometric verification can be used to filter the set of images from the image database to ensure that the set of images from the image database were acquired from the same 3D location that was acquired by the input image 602. After mutual nearest neighbors matching to determine the 2D-2D matches, further geometric verification can be applied by verifying consistency of matches to pose estimation. Geometric matching can compare the 3D locations determined for the set of images from image database as described above with projected rays from the six DoF pose of the camera to ensure that they intersect.

The 2D-2D matches from each vehicle image/database pair are aggregated and turned into 2D-3D matches to the SfM map. PnP+RANSAC is then applied to the set of 2D-3D matches. Based on the selected route segment, a previously selected camera, and a determined set of pose estimation parameters that control the P-n-P/RANSAC loop can be selected that have been determined to optimize the accuracy of the six DoF camera pose determined by the P-n-P/RANSAC loop. Following determination of the pose estimation parameters, the 2D feature points from the acquired input image 602 and the set of 2D feature points from the set of images from the images database are input to six DoF camera pose determination 608. Starting the P-n-P/RANSAC loop with the approximate camera locations can speed the process of determining the six DoF camera pose considerably.

At six DoF camera pose determination block 608 the 2D feature points from the acquired image 602 and 2D feature points included in the set of images from the image database selected at 2D-2D matching are input to the P-n-P/RANSAC loop to determine a six DoF camera pose. The P-n-P algorithm determines a six DoF camera pose based on matching the 2D feature points from the input image 602 with 3D feature points included in the SfM map by minimizing the equation:

$$\operatorname*{argmin}_{R,t} \sum_j \left\| u_j - \prod (RX_j + t) \right\|^2 \qquad (1)$$

Where R,t are the rotation and translation of the six DoF camera pose relative to the SfM map, $u_j$ are the $\{1, \ldots, j, \ldots, N\}$ 2D feature points and $X_j$ are $\{1, \ldots, j, \ldots N\}$ 3D feature points from the SfM. Equation (1) is iteratively evaluated within a RANSAC loop to determine a minimal value, i.e., the best match between the 2D feature points from the input image 602 and a set of 3D feature points from the SfM map using a Gauss-Newton non-linear gradient descent algorithm. A RANSAC loop refers to a technique for systematically disregarding outlier data points i.e., poorly matching individual pairs of 2D/3D feature points to help the algorithm converge more quickly.

Pose estimation parameters that control the P-n-P/RANSAC loop include camera selection, image portion selection, local feature matcher, reprojection error, and a RANSAC scoring function. An example vehicle 110 can have six cameras, each facing a different direction with respect to the vehicle, i.e., front, side left, side right, rear, etc. Each camera can have an SIM reconstruction, and each route segment can have a camera indicator that indicates which camera images to use in as part of its configuration. The local feature matcher parameter selects between mutual nearest neighbor (MNN) matching and MNN+geometric verification matching. MNN matching requires that both the 2D feature point and the 3D feature point are each other's nearest neighbor in both sets of feature points. Geometric verification determines that the projection of the 2D feature point from the current six DoF camera pose intersects the SfM 3D map at the appropriate location as discussed above. The reprojection error parameter determines whether the P-n-P/RANSAC loop converges to a 5 pixel error, a 10 pixel error or a 15 pixel error. The RANSAC scoring parameter modifies the RANSAC algorithm to replace the σ parameter which guides the selection of outlier results in the RANSAC algorithm with a MAGSAC scoring function that includes a fixed, upper limit to guide the selection of outliers. MAGSAC can delay convergence of the P-n-P/RANSAC loop but can yield more stable results. The two choices for local feature matcher, three choices for reprojection error, and two choices for RANSAC scoring parameter yields 12 different possibilities for pose estimation parameters. Each route segment will have a set of pose estimation parameters of the 12 different possible pose estimation parameter combinations selected that yielded the most accurate results on the test dataset.

The six DoF camera pose determined in global coordinates with respect to three orthogonal position axes (x, y, z, coordinate axes) and three rotational axes (defining respective rotations about the position axes) is output as a six DoF vehicle pose determination 610 where the six DoF camera pose is converted to a six DoF vehicle pose based on the six DoF offset between the six DoF camera pose and the six DoF vehicle pose. The six DoF offset between the six DoF camera pose and the six DoF vehicle pose can be determined at the time the camera is installed in the vehicle 110. The six DoF vehicle pose can be output to computing device 115 included in vehicle 110 to be used to operate the vehicle 110. Because the six DoF vehicle pose is determined with respect to a high-resolution map, the six DoF vehicle pose can be used to operate a vehicle 110. A computing device 115 in a vehicle can determine a vehicle path with respect to the high-resolution map upon which the vehicle 110 is intended to travel. The six DoF vehicle pose can also be used to maintain the vehicle's position with respect to the vehicle path by controlling one or more of vehicle powertrain, vehicle steering and vehicle brakes. Updating the six DoF vehicle pose can provide feedback to the computing device 115 to permit the computing device 115 to direct the vehicle 110 to operate on the vehicle path.

Figure 7:
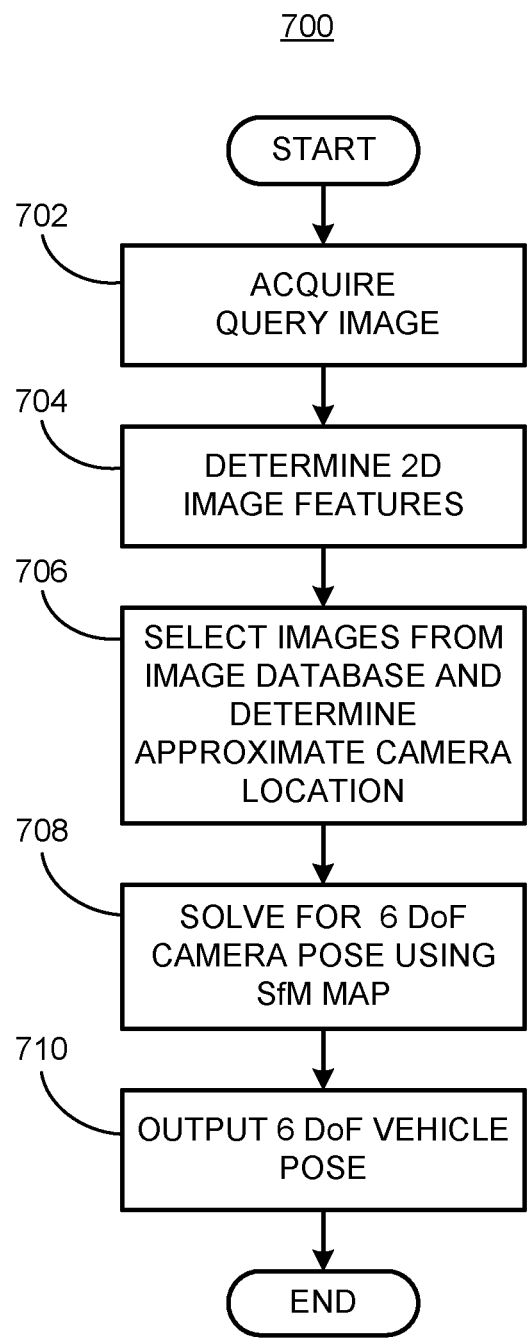
FIG. 7 is a flowchart diagram of an example process to determine a six degree of freedom vehicle pose.

FIG. 7 is a flowchart, described in relation to FIGS. 1-6, of a process 700 for determining a six DoF vehicle pose based on an image acquired by a vehicle sensor 116. Process 700 can be implemented by a processor of a computing device 115 or server computer 120, taking as input image data from a sensor 116, executing commands on a computing device 115, and outputting a six DoF vehicle pose. Process 700 includes multiple blocks that can be executed in the illustrated order. Process 700 could alternatively or additionally include fewer blocks or can include the blocks executed in different orders.

Process 700 begins at block 702, where a computing device 115 inputs a query image 602 to a six DoF camera pose system 600. The query image 602 can be a monocular RGB image can be acquired by a camera included in a vehicle 110.

At block 704 six DoF camera pose system 600 determines 2D image features as discussed in relation to FIGS. 3 and 5, above.

At block 706 six DoF camera pose system 600 determines a set of images included in an image database based on the 2D image features and determines an approximate location of the camera with respect to a route 402.

At block 708 the six DoF camera pose system 600 determines a six DoF camera pose based on the 2D image features, the set of images from the image database and pose estimation parameters based on the approximate location of the camera using a P-n-P/RANSAC algorithm and an SfM map as described above in relation to FIG. 6, above.

At block 710 the six DoF camera pose system 600 determines a six DoF vehicle pose based on the six DoF camera pose as discussed in relation to FIG. 6, above. After block 710 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine an approximate camera location on a route by inputting a first image acquired by a camera included in a vehicle to a convolutional neural network;
extract first image feature points from the first image;
select pose estimation parameters for a pose estimation algorithm based on the approximate camera location;
determine a six degree-of-freedom (DoF) camera pose by inputting the first image feature points and second feature points included in a structure-from-motion (SfM) map based on the route to the pose estimation algorithm which is controlled by the pose estimation parameters, wherein the SfM map includes a collection of three-dimensional points visible from the route generated by determining three-dimensional locations of image feature points in global coordinates from the dataset of reference images and combining them using a 3D mapping software program; and
determine a six DoF vehicle pose based on the six DoF camera pose.

2. The computer of claim 1, the instructions including further instructions to operate a vehicle by determining a vehicle path based on the six DoF vehicle pose.

3. The computer of claim 1, wherein a dataset of reference images is acquired by a camera included in a vehicle as it travels the route.

4. The computer of claim 3, wherein the convolutional neural network is trained based on a generic dataset of reference images.

5. The computer of claim 1, wherein the pose estimation algorithm includes a Perspective-n-Point (P-n-P) algorithm in a Random Sample Consensus (RANSAC) loop.

6. The computer of claim 1, wherein the pose estimation parameters include one or more of camera selection, image region selection, a local feature matcher, a reprojection error, and a RANSAC scoring function.

7. The computer of claim 1, wherein the pose estimation parameters are selected based on the approximate camera location with respect to overlapping portions of the route having approximately equal length.

8. The computer of claim 1, wherein the instructions include further instructions to extract the first image feature points from the first image using a feature extraction algorithm which includes one or more of Superpoint, Reliable and Repeatable Detector and Descriptor, and Scale Invariant Feature Transform.

9. The computer of claim 1, wherein the six DoF vehicle pose is determined based on the six DoF camera pose by determining a six DoF offset between the vehicle and the camera.

10. The computer of claim 1, wherein the six DoF camera pose and the six DoF vehicle pose is determined in global coordinates with respect to three orthogonal position axes and three rotations about the three orthogonal position axes, respectively.

11. A method, comprising:
determining an approximate camera location on a route by inputting a first image acquired by a camera included in a vehicle to a convolutional neural network;
extracting first image feature points from the first image;
selecting pose estimation parameters for a pose estimation algorithm based on the approximate camera location;
determining a six degree-of-freedom (DoF) camera pose by inputting the first image feature points and second feature points included in a structure-from-motion (SfM) map based on the route to the pose estimation algorithm which is controlled by the pose estimation parameters, wherein the SfM map includes a collection of three-dimensional points visible from the route generated by determining three-dimensional locations of image feature points in global coordinates from the dataset of reference images and combining them using a 3D mapping software program; and
determining a six DoF vehicle pose based on the six DoF camera pose.

12. The method of claim 11, further comprising operating a vehicle by determining a vehicle path based on the six DoF vehicle pose.

13. The method of claim 11, wherein a dataset of reference images is acquired by a camera included in a vehicle as it travels the route.

14. The method of claim 13, wherein the convolutional neural network is trained based on a generic dataset of reference images.

15. The method of claim 11, wherein the pose estimation algorithm includes a Perspective-n-Point (P-n-P) algorithm in a Random Sample Consensus (RANSAC) loop.

16. The method of claim 11, wherein the pose estimation parameters include one or more of camera selection, image region selection, a feature matcher, a reprojection error, and a RANSAC scoring function.

17. The method of claim 11, wherein the pose estimation parameters are selected based on the approximate camera location with respect to overlapping portions of the route having approximately equal length.

18. The method of claim 11, wherein extracting the first image feature points from the first image includes using a feature extraction algorithm which includes one or more of Superpoint, Reliable and Repeatable Detector and Descriptor, and Scale Invariant Feature Transform.

19. The method of claim 11, wherein the six DoF vehicle pose is determined based on the six DoF camera pose by determining a six DoF offset between the vehicle and the camera.

20. The method of claim 11, wherein the six DoF camera pose and the six DoF vehicle pose is determined in global coordinates with respect to three orthogonal position axes and three rotations about the three orthogonal position axes, respectively.

* * * * *